(12) United States Patent
Christian et al.

(10) Patent No.: US 11,193,608 B2
(45) Date of Patent: Dec. 7, 2021

(54) VALVES INCLUDING ONE OR MORE FLUSHING FEATURES AND RELATED ASSEMBLIES, SYSTEMS, AND METHODS

(71) Applicant: Flowserve Management Company, Irving, TX (US)

(72) Inventors: Cinnamon Christian, North Wales, PA (US); Stephen Schappert, Irving, TX (US); Andreas Dreiss, Hamburg (DE); Tim Nitz, Irving, TX (US); Mark O'Sullivan, Phillipsburg, NJ (US)

(73) Assignee: Flowserve Management Company, Irving, TX (US)

( * ) Notice: Subject to any disclaimer, the term of this patent is extended or adjusted under 35 U.S.C. 154(b) by 180 days.

(21) Appl. No.: 16/678,819

(22) Filed: Nov. 8, 2019

(65) Prior Publication Data

US 2020/0149657 A1 May 14, 2020

Related U.S. Application Data

(60) Provisional application No. 62/758,340, filed on Nov. 9, 2018.

(51) Int. Cl.
| | | |
|---|---|---|
| *F16K 51/00* | (2006.01) | |
| *G05D 16/00* | (2006.01) | |
| *F16K 11/07* | (2006.01) | |
| *F16K 15/02* | (2006.01) | |
| *B08B 5/02* | (2006.01) | |
| *B08B 9/032* | (2006.01) | |

(52) U.S. Cl.
CPC .............. *F16K 51/00* (2013.01); *B08B 5/02* (2013.01); *B08B 9/0328* (2013.01); *G05D 16/028* (2019.01); *B08B 2209/032* (2013.01); *F16K 11/07* (2013.01); *F16K 15/02* (2013.01)

(58) Field of Classification Search
CPC ... B08B 5/02; B08B 9/0328; B08B 2209/032; Y10T 137/0419; Y10T 137/4238; Y10T 137/4358; Y10T 137/4365; Y10T 137/4372; F16K 15/02; F16K 11/07; F16K 51/02; G05D 16/028
See application file for complete search history.

(56) References Cited

U.S. PATENT DOCUMENTS

| 1,577,242 A | 3/1926 | Andersen | |
|---|---|---|---|
| 1,647,189 A * | 11/1927 | Mueller | .................... E03D 3/04 |
| | | | 137/245 |

(Continued)

FOREIGN PATENT DOCUMENTS

| CN | 101705930 B | 2/2012 |
|---|---|---|
| CN | 102421513 A | 4/2012 |

(Continued)

OTHER PUBLICATIONS

PCT International Patent Application No. PCT/US2019/060583, Written Opinion dated Mar. 19, 2020, 5 pp.

(Continued)

*Primary Examiner* — Jessica Cahill
(74) *Attorney, Agent, or Firm* — Phillips Winchester (57) ABSTRACT

Valve and related assemblies, systems, and methods may include a self-cleaning feature that may be configured to at least partially displace material from a portion of the valve. Such valves may be utilized in a pressure exchanger.

20 Claims, 5 Drawing Sheets

(56) References Cited

U.S. PATENT DOCUMENTS

| | | | |
|---|---|---|---|
| 1,647,734 A | 11/1927 | Kelly | |
| 1,769,672 A | 7/1930 | Blair | |
| 2,024,905 A * | 12/1935 | Bard | F16K 5/222 |
| | | | 137/539 |
| 2,206,356 A * | 7/1940 | Hutchings | F16K 15/06 |
| | | | 137/515.7 |
| 2,365,046 A | 12/1944 | Bottomley | |
| 2,600,836 A | 6/1952 | Boyd | |
| 2,615,465 A | 10/1952 | Woodward | |
| 3,089,504 A | 5/1963 | Crawford | |
| 3,223,173 A | 12/1965 | Paul, Jr. | |
| 3,347,554 A | 10/1967 | Jagger et al. | |
| 3,570,510 A | 3/1971 | Tsutsumi | |
| 3,583,606 A | 6/1971 | Ewald | |
| 3,595,265 A | 7/1971 | Cryder et al. | |
| 3,612,361 A | 10/1971 | Ewald et al. | |
| 3,661,167 A | 5/1972 | Hussey | |
| 3,661,400 A | 5/1972 | Weinand | |
| 3,675,825 A | 7/1972 | Morane | |
| 3,675,935 A | 7/1972 | Ludwig et al. | |
| 3,741,243 A | 6/1973 | Deibler et al. | |
| 3,749,291 A | 7/1973 | Prussin et al. | |
| 3,756,273 A | 9/1973 | Hengesbach | |
| 3,776,278 A | 12/1973 | Allen | |
| 4,024,891 A | 5/1977 | Engel et al. | |
| 4,123,332 A | 10/1978 | Rotter | |
| 4,133,346 A | 1/1979 | Smith et al. | |
| 4,134,454 A | 1/1979 | Taylor | |
| 4,140,147 A * | 2/1979 | Van't Sant | F16K 25/02 |
| | | | 137/240 |
| 4,164,236 A * | 8/1979 | Owen | F16K 1/2263 |
| | | | 137/240 |
| 4,176,063 A | 11/1979 | Tyler | |
| 4,234,010 A | 11/1980 | Jenkins et al. | |
| 4,236,547 A | 12/1980 | Harasewych | |
| 4,244,555 A | 1/1981 | Maggioni et al. | |
| 4,308,103 A | 12/1981 | Rotter | |
| 4,321,021 A | 3/1982 | Pauliukonis | |
| 4,350,176 A | 9/1982 | Lace | |
| 4,412,632 A | 11/1983 | Berger et al. | |
| 4,424,917 A | 1/1984 | Berger et al. | |
| 4,479,356 A | 10/1984 | Gill | |
| 4,510,963 A | 4/1985 | Presley et al. | |
| 4,518,006 A | 5/1985 | Hoffmann et al. | |
| 4,570,853 A | 2/1986 | Schmied | |
| 4,579,511 A | 4/1986 | Burns | |
| 4,586,692 A | 5/1986 | Stephens | |
| 4,627,461 A | 12/1986 | Gordon | |
| 4,726,530 A | 2/1988 | Miller et al. | |
| 4,768,542 A | 9/1988 | Morris | |
| 4,834,193 A | 5/1989 | Leitko et al. | |
| 4,999,872 A | 3/1991 | Jentsch | |
| 5,033,557 A | 7/1991 | Askew | |
| 5,070,817 A | 12/1991 | Momont | |
| 5,172,918 A | 12/1992 | Pecht et al. | |
| 5,232,013 A | 8/1993 | Morris | |
| 5,234,031 A | 8/1993 | Pickett et al. | |
| 5,240,036 A | 8/1993 | Morris | |
| 5,299,859 A | 4/1994 | Tackett et al. | |
| 5,300,041 A | 4/1994 | Haber et al. | |
| 5,357,995 A | 10/1994 | King et al. | |
| 5,797,429 A | 8/1998 | Shumway | |
| 5,951,169 A | 9/1999 | Oklejas et al. | |
| 5,992,289 A | 11/1999 | George et al. | |
| 6,036,435 A | 3/2000 | Oklejas | |
| 6,126,418 A | 10/2000 | Sinnl | |
| 6,293,245 B1 | 9/2001 | Bock | |
| RE37,921 E | 12/2002 | Martin et al. | |
| 6,516,897 B2 | 2/2003 | Thompson | |
| 6,540,487 B2 | 4/2003 | Polizos et al. | |
| 6,607,368 B1 | 8/2003 | Ross et al. | |
| 6,647,938 B2 | 11/2003 | Gaessler et al. | |
| 6,659,731 B1 | 12/2003 | Hauge | |
| 6,907,892 B2 * | 6/2005 | Sugano | F16K 1/2268 |
| | | | 134/94.1 |
| 7,128,084 B2 | 10/2006 | Long et al. | |
| 7,201,557 B2 | 4/2007 | Stover | |
| 7,306,437 B2 | 12/2007 | Hauge | |
| 7,474,013 B2 | 1/2009 | Greenspan et al. | |
| 7,670,482 B2 | 3/2010 | Wietham | |
| 7,871,522 B2 | 1/2011 | Stover et al. | |
| RE42,432 E | 6/2011 | Stover | |
| 7,997,853 B2 | 8/2011 | Pique et al. | |
| 8,075,281 B2 | 12/2011 | Martin et al. | |
| 8,297,303 B2 | 10/2012 | Desantis et al. | |
| 8,360,250 B2 | 1/2013 | Nguyen et al. | |
| 8,413,672 B2 * | 4/2013 | Tirrell | F16K 51/00 |
| | | | 137/15.04 |
| 8,430,110 B2 * | 4/2013 | Tolle | F16K 1/446 |
| | | | 137/15.04 |
| 8,465,000 B2 | 6/2013 | Bartell et al. | |
| 8,579,603 B2 | 11/2013 | Oklejas et al. | |
| 8,602,045 B2 * | 12/2013 | Downer | B08B 9/00 |
| | | | 137/15.04 |
| 8,603,218 B2 | 12/2013 | Montie et al. | |
| 8,622,714 B2 | 1/2014 | Andrews | |
| 9,108,162 B2 | 8/2015 | Takahashi et al. | |
| 9,133,960 B2 * | 9/2015 | Lucas | F16K 49/007 |
| 9,163,737 B2 | 10/2015 | Andersson | |
| 9,328,743 B2 | 5/2016 | Hirosawa et al. | |
| 9,435,354 B2 | 9/2016 | Lehner et al. | |
| 9,440,895 B2 | 9/2016 | Arluck et al. | |
| 9,500,394 B2 | 11/2016 | Manzo | |
| 9,523,261 B2 | 12/2016 | Flores et al. | |
| 9,546,671 B2 | 1/2017 | Hirosawa et al. | |
| 9,556,736 B2 | 1/2017 | Sigurdsson | |
| 9,587,752 B2 | 3/2017 | Montague | |
| 9,604,889 B2 | 3/2017 | Arluck et al. | |
| 9,611,948 B1 | 4/2017 | Andersson | |
| 9,683,574 B2 | 6/2017 | Winkler et al. | |
| 9,695,795 B2 | 7/2017 | Martin et al. | |
| 9,739,128 B2 | 8/2017 | Ghasripoor et al. | |
| 9,739,275 B2 | 8/2017 | Robison et al. | |
| 9,759,054 B2 | 9/2017 | Gay et al. | |
| 9,764,272 B2 | 9/2017 | Martin et al. | |
| 9,835,018 B2 | 12/2017 | Krish et al. | |
| 9,885,372 B2 | 2/2018 | Arluck et al. | |
| 9,920,774 B2 | 3/2018 | Ghasripoor et al. | |
| 9,945,210 B2 | 4/2018 | Theodossiou | |
| 9,945,216 B2 * | 4/2018 | Ghasripoor | F04F 13/00 |
| 9,970,281 B2 | 5/2018 | Ghasripoor et al. | |
| 9,975,789 B2 | 5/2018 | Ghasripoor et al. | |
| 9,976,573 B2 | 5/2018 | Martin et al. | |
| 10,001,030 B2 | 6/2018 | Krish et al. | |
| 10,006,524 B2 | 6/2018 | Crump et al. | |
| 10,024,496 B2 | 7/2018 | Hauge | |
| 10,030,372 B2 | 7/2018 | Di Monte, Sr. | |
| 10,072,675 B2 | 9/2018 | Mclean et al. | |
| 10,119,379 B2 | 11/2018 | Richter et al. | |
| 10,125,796 B2 | 11/2018 | Hauge | |
| 10,138,907 B2 | 11/2018 | Pinto et al. | |
| 10,167,710 B2 | 1/2019 | Ghasripoor et al. | |
| 10,167,712 B2 | 1/2019 | Ghasripoor et al. | |
| 2002/0025264 A1 | 2/2002 | Polizos et al. | |
| 2004/0118462 A1 | 6/2004 | Baumann | |
| 2005/0103386 A1 * | 5/2005 | Magda | F16K 15/026 |
| | | | 137/541 |
| 2005/0252551 A1 * | 11/2005 | DeCourcy | F16K 17/16 |
| | | | 137/240 |
| 2006/0145426 A1 | 7/2006 | Schroeder et al. | |
| 2006/0196474 A1 | 9/2006 | Magel | |
| 2006/0231577 A1 | 10/2006 | Powling et al. | |
| 2007/0204916 A1 | 9/2007 | Clayton et al. | |
| 2009/0057084 A1 | 3/2009 | Mahawili | |
| 2009/0104046 A1 | 4/2009 | Martin et al. | |
| 2009/0313737 A1 | 12/2009 | Richard | |
| 2012/0024249 A1 | 2/2012 | Fuhrmann et al. | |
| 2012/0067825 A1 | 3/2012 | Pique et al. | |
| 2014/0026608 A1 | 1/2014 | Manzo et al. | |
| 2014/0048143 A1 | 2/2014 | Lehner et al. | |
| 2014/0284058 A1 | 9/2014 | Watson et al. | |

(56) References Cited

U.S. PATENT DOCUMENTS

| | | |
|---|---|---|
| 2015/0096739 A1* | 4/2015 | Ghasripoor ............ F04F 13/00 166/105 |
| 2015/0130142 A1 | 5/2015 | Zheng et al. |
| 2015/0184540 A1 | 7/2015 | Winkler et al. |
| 2015/0292310 A1 | 10/2015 | Ghasripoor et al. |
| 2016/0032691 A1 | 2/2016 | Richter et al. |
| 2016/0032702 A1 | 2/2016 | Gay et al. |
| 2016/0039054 A1 | 2/2016 | Ghasripoor et al. |
| 2016/0062370 A1 | 3/2016 | Gaines-Germain et al. |
| 2016/0101307 A1 | 4/2016 | Montague |
| 2016/0102536 A1 | 4/2016 | Knoeller |
| 2016/0138649 A1 | 5/2016 | Anderson et al. |
| 2016/0146229 A1 | 5/2016 | Martin et al. |
| 2016/0153551 A1 | 6/2016 | Schiele et al. |
| 2016/0160849 A1 | 6/2016 | Gains-Germain et al. |
| 2016/0160881 A1 | 6/2016 | Anderson et al. |
| 2016/0160882 A1 | 6/2016 | Morphew |
| 2016/0160887 A1 | 6/2016 | Anderson |
| 2016/0160888 A1 | 6/2016 | Morphew |
| 2016/0160889 A1 | 6/2016 | Hoffman et al. |
| 2016/0160890 A1 | 6/2016 | Anderson |
| 2016/0160917 A1 | 6/2016 | Deshpande |
| 2016/0377096 A1 | 12/2016 | Lehner et al. |
| 2017/0108131 A1 | 4/2017 | Andersson |
| 2017/0130743 A1 | 5/2017 | Anderson |
| 2017/0254474 A1 | 9/2017 | Sauer |
| 2017/0306986 A1 | 10/2017 | Mclean et al. |
| 2017/0306987 A1 | 10/2017 | Theodossiou |
| 2017/0350428 A1 | 12/2017 | Martin et al. |
| 2017/0370500 A1 | 12/2017 | Haines et al. |
| 2018/0056211 A1 | 3/2018 | Seabrook et al. |
| 2018/0087364 A1 | 3/2018 | Krish et al. |
| 2018/0094648 A1 | 4/2018 | Hoffman et al. |
| 2018/0120197 A1 | 5/2018 | Di Monte |
| 2018/0195370 A1 | 7/2018 | Theodossiou |
| 2018/0209254 A1 | 7/2018 | Ghasripoor et al. |
| 2018/0252239 A1 | 9/2018 | Martin et al. |
| 2018/0306672 A1 | 10/2018 | Pattom et al. |
| 2018/0347601 A1 | 12/2018 | Hoffman et al. |
| 2019/0071340 A1 | 3/2019 | Imrie |
| 2020/0149362 A1 | 5/2020 | Terwilliger et al. |
| 2020/0149380 A1 | 5/2020 | Procita et al. |
| 2020/0149556 A1 | 5/2020 | Judge et al. |
| 2020/0149557 A1 | 5/2020 | Le Doux, Jr. et al. |
| 2020/0150698 A1 | 5/2020 | Judge et al. |

FOREIGN PATENT DOCUMENTS

| | | |
|---|---|---|
| CN | 206158951 U | 5/2017 |
| EP | 0163897 B1 | 7/1988 |
| EP | 1486706 A1 | 12/2004 |
| EP | 3177429 A1 | 6/2017 |
| GB | 0946494 A | 1/1964 |
| JP | 6386657 B2 | 9/2018 |
| NZ | 503937 A | 6/2002 |
| SG | 151056 A1 | 5/2009 |
| SU | 410199 A1 | 1/1974 |
| WO | 02/66816 A1 | 8/2002 |
| WO | 2009/113877 A2 | 9/2009 |
| WO | 2010/031162 A9 | 11/2010 |
| WO | 2016/022706 A1 | 2/2016 |
| WO | 2016/063194 A3 | 7/2016 |
| WO | 2017/083500 A1 | 5/2017 |
| WO | 2018/035201 A1 | 2/2018 |
| WO | 2018/085740 A2 | 5/2018 |

OTHER PUBLICATIONS

PCT International Patent Application No. PCT/US2019/060583, International Search Report dated Mar. 19, 2020, 2 pp.

Vorteq Pure Grit, This changes everything, Brochure, Energy Recovery Inc, 8 pages, Dec. 2014.

* cited by examiner

VALVES INCLUDING ONE OR MORE FLUSHING FEATURES AND RELATED ASSEMBLIES, SYSTEMS, AND METHODS

CROSS-REFERENCE TO RELATED APPLICATION

This application claims the benefit under 35 U.S.C. § 119(e) of U.S. Provisional Patent Application Ser. No. 62/758,340, filed Nov. 9, 2018, for "Valves Including One or More Flushing Features and Related Assemblies, Systems, and Methods," the disclosure of which is hereby incorporated herein in its entirety by this reference.

TECHNICAL FIELD

Embodiments of the disclosure relate generally to valves including one or more flushing features. More particularly, embodiments of the disclosure relate to valves one or more flushing features for removing debris or other object from the valve and to related assemblies and to related methods. In some instances, such valves may be utilized in fluid exchange devices for one or more of exchanging properties (e.g., pressure) between fluids and systems and methods.

BACKGROUND

Industrial processes often involve hydraulic systems including pumps, valves, impellers, etc. Pumps, valves, and impellers may be used to control the flow of the fluids used in the hydraulic processes. For example, some pumps may be used to increase (e.g., boost) the pressure in the hydraulic system, other pumps may be used to move the fluids from one location to another. Some hydraulic systems include valves to control where a fluid flows. Valves may include control valves, ball valves, gate valves, globe valves, check valves, isolation valves, combinations thereof, etc.

Some industrial processes involve the use of caustic fluids, abrasive fluids, and/or acidic fluids. These types of fluids may increase the amount of wear on the components of a hydraulic system. The increased wear may result in increased maintenance and repair costs or require the early replacement of equipment. For example, abrasive, caustic, or acidic fluid may increase the wear on the internal components of a pump such as an impeller, shaft, vanes, nozzles, etc. Some pumps are rebuildable and an operation may choose to rebuild a worn pump replacing the worn parts which may result in extended periods of downtime for the worn pump resulting in either the need for redundant pumps or a drop in productivity. Other operations may replace worn pumps at a larger expense but a reduced amount of downtime.

Well completion operations in the oil and gas industry often involve hydraulic fracturing (often referred to as fracking or fracing) to increase the release of oil and gas in rock formations. Hydraulic fracturing involves pumping a fluid (e.g., frac fluid, fracking fluid, etc.) containing a combination of water, chemicals, and proppant (e.g., sand, ceramics) into a well at high pressures. The high pressures of the fluid increases crack size and crack propagation through the rock formation releasing more oil and gas, while the proppant prevents the cracks from closing once the fluid is depressurized. Fracturing operations use high-pressure pumps to increase the pressure of the fracking fluid. However, the proppant in the fracking fluid increases wear and maintenance on and substantially reduces the operation lifespan of the high-pressure pumps due to its abrasive nature.

BRIEF SUMMARY

Various embodiments may include a device or system for exchanging pressure between fluids. The device may include a tank and a directional valve device. The tank may include a clean side for receiving a clean fluid at a higher pressure and a dirty side for receiving a downhole fluid (e.g., fracking fluid, drilling fluid) at a lower pressure. At least one port may be positioned proximate to the dirty side of the at least one tank and define a fluid pathway. At least one valve may be disposed along the fluid pathway of the at least one port. The valve may be configured to at least one of enable the downhole fluid to enter the tank or enable the downhole fluid to exit the tank. The valve may include a valve body, a valve seat, a valve member configured to define a seal with the valve seat, and at least one flushing feature. The flushing feature may be configured to supply fluid to at least a portion of the valve seat of the valve along another fluid pathway at least partially separated from the fluid pathway of the at least one port. The flushing feature may be configured to at least partially displace material from the valve seat. The directional valve device may be configured to selectively place the clean fluid at the higher pressure in communication with the downhole fluid at the lower pressure through at least one piston in order to pressurize the downhole fluid to a second higher pressure.

Another embodiment may include a device or system for exchanging pressure between fluids. The device may include a first side for receiving a first fluid at a higher pressure and a second side for receiving a second fluid at a lower pressure. The device may also include at least one port and at least one valve. The port may be positioned proximate the second side of the tank and define a first fluid pathway. The valve may be disposed along the first fluid pathway of the port. The valve may be configured to at least one of enable the second fluid to enter the tank or enable the second fluid to exit the tank. The valve may include a valve body, a valve seat, a valve member, and a self-cleaning feature. The valve body may define a portion of the first fluid pathway. The valve body may also define a portion of a second fluid pathway. The valve member may be configured to define a seal with the valve seat. The self-cleaning feature may be configured to supply fluid to at least a portion of the valve seat of the valve along the second fluid pathway. The self-cleaning feature may be configured to at least partially displace material from at least one of the valve seat or the valve member.

Another embodiment may include a valve. The valve may include a valve body, a valve member, at least one flushing feature. The valve body may have a fluid passage defined through the valve body. The valve body may include a seat portion. The valve member may be coupled to the valve body. The valve member may be movable relative to the valve body in order to at least partially obstruct the fluid passage. The flushing feature may be configured to supply fluid to at least a portion of the valve along another fluid pathway at least partially separated from the fluid pathway of the valve body. The flushing feature may be configured to at least partially displace material from the valve.

Another embodiment may include a system for exchanging pressure between at least two fluid streams. The system may include a pressure exchange device as described above, and at least one pump for supplying clean fluid to the pressure exchange device.

Another embodiment may include a method of controlling operating a valve. The method may include flowing fluid through a valve body along a fluid passageway defined through the valve body; at least partially obstructing flow of the fluid through the valve body by moving a valve member toward of a valve seat defined by the valve body; and at least partially displacing material from the valve by supplying fluid to at least a portion of the valve proximate the valve seat along another fluid pathway at least partially separated from the fluid pathway of the valve body with at least one flushing feature.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not meant to be actual views of any particular fluid exchanger or component thereof, but are merely idealized representations employed to describe illustrative embodiments. The drawings are not necessarily to scale. Elements common between figures may retain the same numerical designation.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

As used herein, the term "fluid" may mean and include fluids of any type and composition. Fluids may take a liquid form, a gaseous form, or combinations thereof, and, in some instances, may include some solid material. In some embodiments, fluids may convert between a liquid form and a gaseous form during a cooling or heating process as described herein. In some embodiments, the term fluid includes gases, liquids, and/or pumpable mixtures of liquids and solids.

Described herein relates generally to valves for controlling fluid flow along a fluid pathway of a fluid conduit (e.g., proximate a fluid inlet and/or outlet). Valves (e.g., check valves, globe valves, etc.) of this sort may be implemented in piping systems, such as piping systems used in a fracking process, a power plant, a boiler application, etc., where it is desirable to have the valve to restrict (e.g., prevent) certain types of fluid flow. For example, the valve may restrict fluid flow in backflow situations in order to avoid damage to associated components of the system in which the valve is implemented or even catastrophic failure in the system.

It is noted that while embodiments of the instant disclosure are discussed herein primarily with reference to check valves (e.g., swing or tilt check valves, in-line check valves, piston check valves, stop-check valves, lift-check valves, one-way check valves, two-way, or more, check valves, etc.), other embodiments of the disclosure may include multiple seats for other types of valves, such as, for example, plug valves, ball valves, stop or globe valves, angle valves, butterfly valves, and gate valves.

Embodiments of the present disclosure may relate to valves utilized, for example, in exchange devices for exchanging one or more properties between fluids (e.g., a pressure exchanger). Such exchangers (e.g., pressure exchangers) are sometimes called "flow-work exchangers" or "isobaric devices" and are machines for exchanging pressure energy from a relatively high-pressure flowing fluid system to a relatively low-pressure flowing fluid system.

Additional embodiments of such valves may be utilized in any other suitable fluid handling application.

In some industrial processes, elevated pressures are required in certain parts of the operation to achieve the desired results, following which the pressurized fluid is depressurized. In other processes, some fluids used in the process are available at high-pressures and others at low-pressures, and it is desirable to exchange pressure energy between these two fluids. As a result, in some applications, great improvement in economy can be realized if pressure can be efficiently transferred between two fluids.

In some embodiments, exchangers as disclosed herein may be similar to and include the various components and configurations of the pressure exchangers disclosed in U.S. Pat. No. 5,797,429 to Shumway, issued Aug. 25, 1998, the disclosure of which is hereby incorporated herein in its entirety by this reference.

Although some embodiments of the present disclosure are depicted as being used and employed as a pressure exchanger between two or more fluids, persons of ordinary skill in the art will understand that the embodiments of the present disclosure may be employed in other implementations such as, for example, the exchange of other properties (e.g., temperature, density, etc.) and/or composition between one or more fluids and/or mixing of two or more fluids.

In some embodiments, a pressure exchanger may be used to protect moving components (e.g., pumps, valves, impellers, etc.) in processes were high pressures are needed in a fluid that has the potential to damage the moving components (e.g., abrasive fluid, caustic fluid, acidic fluid, etc.).

For example, pressure exchange devices according to embodiments of the disclosure may be implemented in hydrocarbon related processes, such as, hydraulic fracturing or other drilling operations (e.g., subterranean downhole drilling operations).

As discussed above, well completion operations in the oil and gas industry often involve hydraulic fracturing, drilling operations, or other downhole operations that use high-pressure pumps to increase the pressure of the downhole fluid (e.g., fluid that is intended to be conducted into a subterranean formation or borehole, such as, fracking fluid, drilling fluid, drilling mud). The proppants, chemicals, additives to produce mud, etc. in these fluids often increase wear and maintenance on the high-pressure pumps.

In some embodiments, a hydraulic fracturing system may include a hydraulic energy transfer system that transfers pressure between a first fluid (e.g., a clean fluid, such as a partially (e.g., majority) or substantially proppant free fluid or a pressure exchange fluid) and a second fluid (e.g., fracking fluid, such as a proppant-laden fluid, an abrasive fluid, or a dirty fluid). Such systems may at least partially (e.g., substantially, primarily, entirely) isolate the high-pressure first fluid from the second dirty fluid while still enabling the pressurizing of the second dirty fluid with the high-pressure first fluid and without having to pass the second dirty fluid directly through a pump or other pressurizing device.

While some embodiments discussed herein may be directed to fracking operations, in additional embodiments, the exchanger systems and devices disclosed herein may be utilized in other operations. For example, devices, systems, and/or method disclosed herein may be used in other downhole operations, such as, for example, downhole drilling operations.

Figure 1:
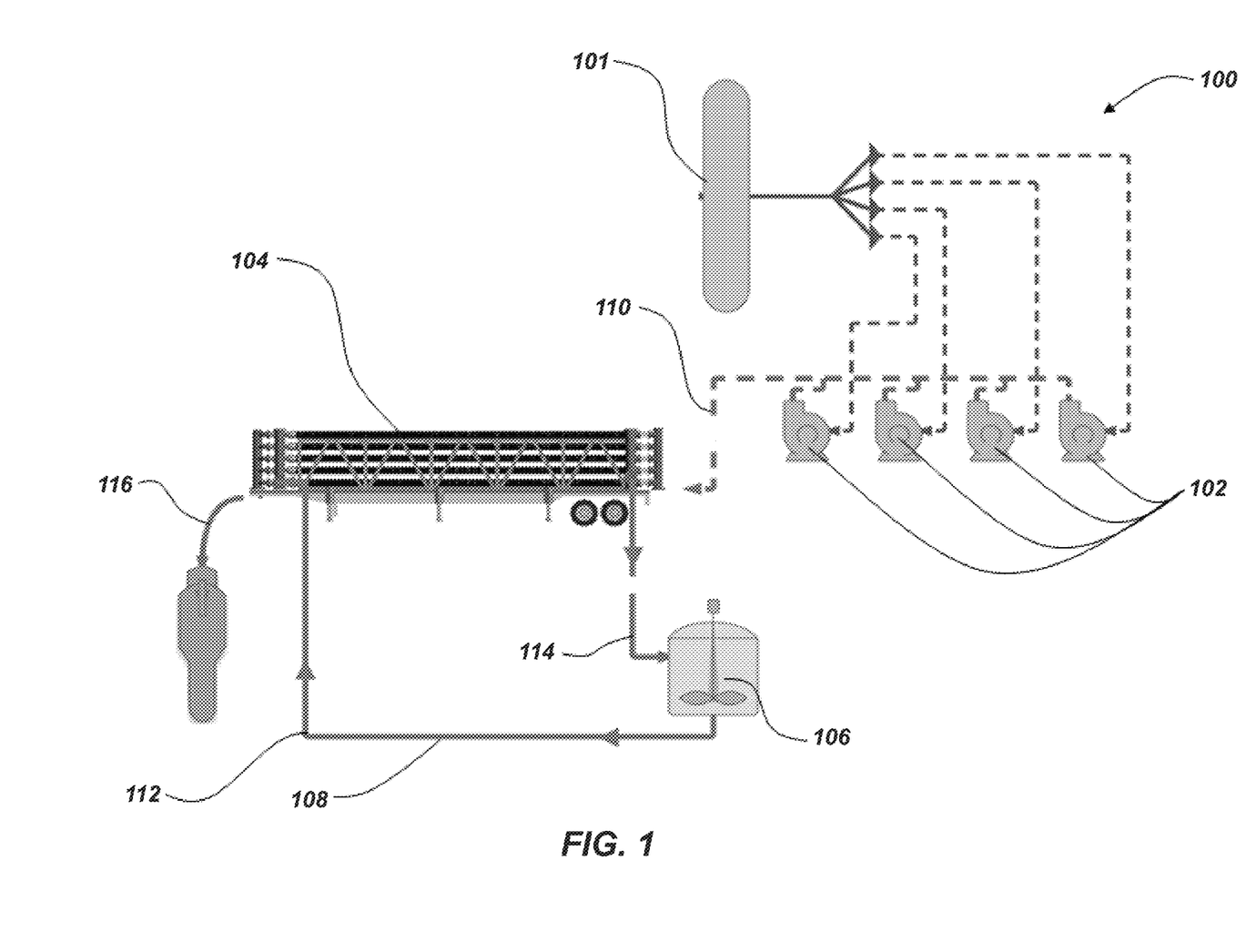
FIG. 1 is schematic view of a hydraulic fracturing system according to an embodiment of the present disclosure.

FIG. 1 illustrates a system diagram of an embodiment of hydraulic fracturing system 100 utilizing a pressure exchanger between a first fluid stream (e.g., clean fluid stream) and a second fluid stream (e.g., a fracking fluid stream). Although not explicitly described, it should be understood that each component of the system 100 may be directly connected or coupled via a fluid conduit (e.g., pipe) to an adjacent (e.g., upstream or downstream) component. The hydraulic fracturing system 100 may include one or more devices for pressurizing the first fluid stream, such as, for example, frack pumps 102 (e.g., reciprocating pumps, centrifugal pumps, scroll pumps, etc.). The system 100 may include multiple frack pumps 102, such as at least two frack pumps 102, at least four frack pumps 102, at least ten frack pumps 102, at least sixteen frack pumps, or at least twenty frack pumps 102. In some embodiments, the frack pumps 102 may provide relatively and substantially clean fluid at a high pressure to a pressure exchanger 104 from a fluid source 101. In some embodiments, fluid may be provided separately to each pump 102 (e.g., in a parallel configuration). After pressurization in the pumps 102, the high pressure clean fluid 110 may be combined and transmitted to the pressure exchanger 104 (e.g., in a serial configuration).

As used herein, "clean" fluid may describe fluid that is at least partially or substantially free (e.g., substantially entirely or entirely free) of chemicals and/or proppants typically found in a downhole fluid and "dirty" fluid may describe fluid that at least partially contains chemicals and/or proppants typically found in a downhole fluid.

The pressure exchanger 104 may transmit the pressure from the high pressure clean fluid 110 to a low pressure fracking fluid (e.g., fracking fluid 112) in order to provide a high pressure fracking fluid 116. The clean fluid may be expelled from the pressure exchanger 104 as a low pressure fluid 114 after the pressure is transmitted to the low pressure fracking fluid 112. In some embodiments, the low pressure fluid 114 may be an at least partially or substantially clean fluid that substantially lacks chemicals and/or proppants aside from a small amount that may be passed to the low pressure fluid 114 from the fracking fluid 112 in the pressure exchanger 104.

In some embodiments, the pressure exchanger 104 may include one or more pressure exchanger devices (e.g., operating in parallel). In such configurations, the high pressure inputs may be separated and provided to inputs of each of the pressure exchanger devices. The outputs of each of the pressure exchanger devices may be combined as the high pressure fracking fluid exits the pressure exchanger 104. For example, and as discussed above with reference to FIG. 1, the pressure exchanger 104 may include two or more (e.g., three) pressure exchanger devices operating in parallel. As depicted, the pressure exchanger 104 may be provided on a mobile platform (e.g., a truck trailer) that may be relatively easily installed and removed from a fracking well site.

After being expelled from the pressure exchanger 104, the low pressure clean fluid 114 may travel to and be collected in a mixing chamber 106 (e.g., blender unit, mixing unit, etc.). In some embodiments, the low pressure fluid 114 may be converted (e.g., modified, transformed, etc.) to the low pressure fracking fluid 112 in the mixing chamber 106. For example, a proppant may be added to the low pressure clean fluid 114 in the mixing chamber 106 creating a low pressure fracking fluid 112. In some embodiments, the low pressure clean fluid 114 may be expelled as waste.

In many hydraulic fracturing operations, a separate process may be used to heat the fracking fluid 112 before the fracking fluid 112 is discharged downhole (e.g., to ensure proper blending of the proppants in the fracking fluid). In some embodiments, using the low pressure clean fluid 114 to produce the fracking fluid 112 may eliminate the step of heating the fracking fluid. For example, the low pressure clean fluid 114 may be at an already elevated temperature as a result of the fracking pumps 102 pressurizing the high pressure clean fluid 110. After transferring the pressure in the high pressure clean fluid 112 that has been heated by the pumps 102, the now low pressure clean fluid 114 retains at least some of that heat energy as it is passed out of the pressure exchanger 104 to the mixing chamber 106. In some embodiments, using the low pressure clean fluid 114 at an already elevated temperature to produce the fracking fluid may result in the elimination of the heating step for the fracking fluid. In other embodiments, the elevated temperature of the low pressure clean fluid 114 may result in a reduction of the amount of heating required for the fracking fluid.

After the proppant is added to the low pressure now fracking fluid 114, the low pressure fracking fluid 112 may be expelled from the mixing chamber 106. The low pressure fracking fluid 112 may then enter the pressure exchanger 104 on the fracking fluid end through a fluid conduit 108 connected (e.g., coupled) between the mixing chamber 106 and the pressure exchanger 104. Once in the pressure exchanger 104, the low pressure fracking fluid 112 may be pressurized by the transmission of pressure from the high pressure clean fluid 110 through the pressure exchanger 104.

The high pressure fracking fluid 116 may then exit the pressure exchanger 104 and be transmitted downhole.

Hydraulic fracturing systems generally require high operating pressures for the high pressure fracking fluid 116. In some embodiments, the desired pressure for the high pressure fracking fluid 116 may be between about 8,000 PSI (55,158 kPa) and about 12,000 PSI (82,737 kPa), such as between about 9,000 PSI (62,052 kPa) and about 11,000 PSI (75,842 kPa), or about 10,000 PSI (68,947 kPa).

In some embodiments, the high pressure clean fluid 110 may be pressurized to a pressure at least substantially the same or slightly greater than the desired pressure for the high pressure fracking fluid 116. For example, the high pressure clean fluid 110 may be pressurized to between about 0 PSI (0 kPa) and about 1000 PSI (6,894 kPa) greater than the desired pressure for the high pressure fracking fluid 116, such as between about 200 PSI (1,379 kPa) and about 700 PSI (4,826 kPa) greater than the desired pressure, or between about 400 PSI (2,758 kPa) and about 600 PSI (4,137 kPa) greater than the desired pressure, to account for any pressure loss during the pressure and exchange process.

Figure 2:
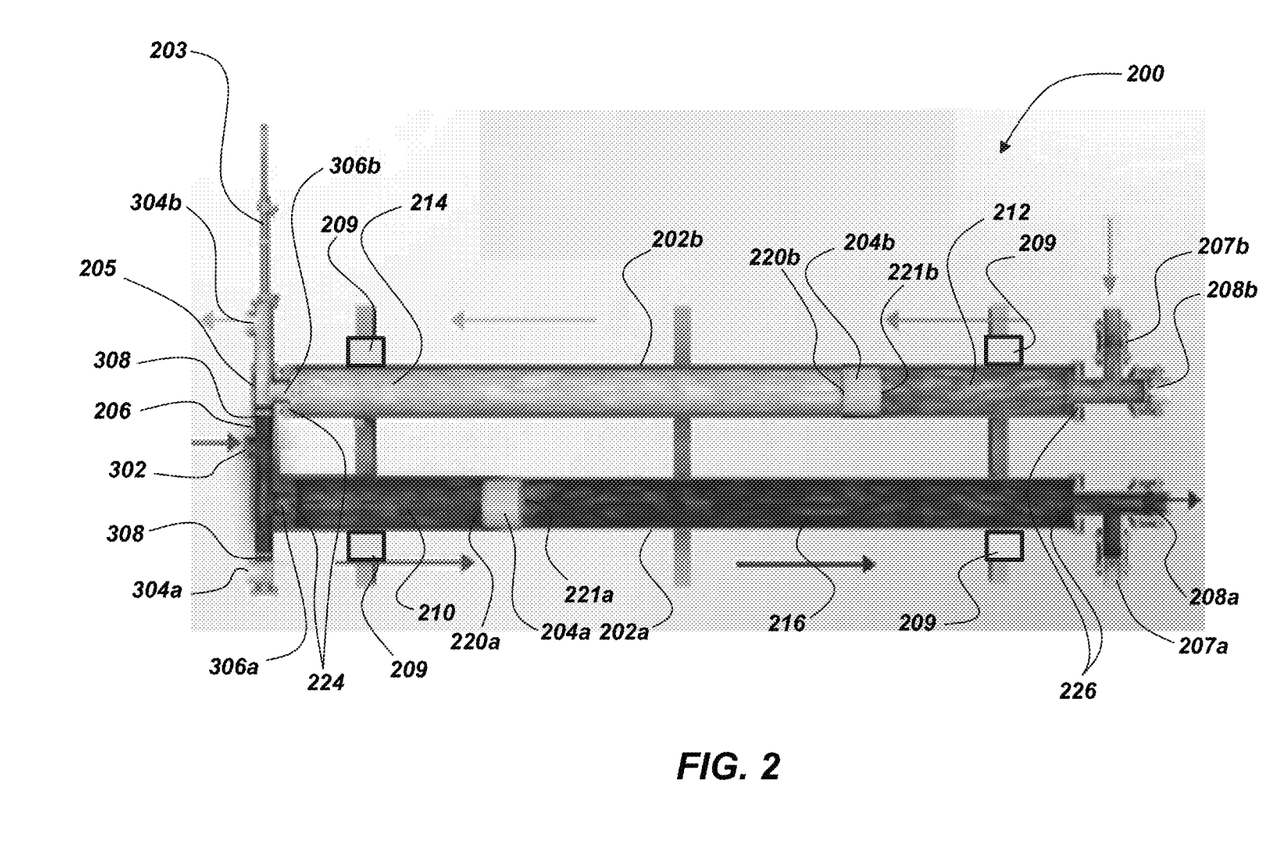
FIG. 2 is cross-sectional view of a fluid exchanger device according to an embodiment of the present disclosure.

FIG. 2 illustrates an embodiment of a pressure exchanger 200. The pressure exchanger 200 may be a linear pressure exchanger in the sense that it is operated by moving or translating an actuation assembly substantially along a linear path. For example, the actuation assembly may be moved linearly to selectively place the low and high pressure fluids in at least partial communication (e.g., indirect communication where the pressure of the high pressure fluid may be transferred to the low pressure fluid) as discussed below in greater detail.

The linear pressure exchanger 200 may include one or more (e.g., two) chambers 202a, 202b (e.g., tanks, collectors, cylinders, tubes, pipes, etc.). The chambers 202a, 202b (e.g., parallel chambers 202a, 202b) may include pistons 204a, 204b configured to substantially maintain the high pressure clean fluid 210 and low pressure clean fluid 214 (e.g., the clean side) separate from the high pressure dirty fluid 216 and the low pressure dirty fluid 212 (e.g., the dirty side) while enabling transfer of pressure between the respective fluids 210, 212, 214, and 216. The pistons 204a, 204b may be sized (e.g., the outer diameter of the pistons 204a, 204b relative to the inner diameter of the chambers 202a, 202b) to enable the pistons 204a, 204b to travel through the chamber 202a, 202b while minimizing fluid flow around the pistons 204a, 204b.

The linear pressure exchanger 200 may include a clean control valve 206 configured to control the flow of high pressure clean fluid 210 and low pressure clean fluid 214. Each of the chambers 202a, 202b may include one or more dirty control valves 207a, 207b, 208a, 208b configured to control the flow of the low pressure dirty fluid 212 and the high pressure dirty fluid 216.

As discussed below in greater detail, one or more of the control valves 207a, 207b, 208a, 208b may comprise a self-cleaning valve that is configured to reduce the amount of material (e.g., contaminants, such as proppants from the dirty or fracking fluid) from a portion of the valve (e.g., a seat of valve).

While the embodiment of FIG. 2 contemplates a linear pressure exchanger 200, other embodiments, may include other types of pressure exchangers that involve other mechanisms for selectively placing the low and high pressure fluids in at least partial communication (e.g., a rotary actuator such as those disclosed in U.S. Pat. No. 9,435,354, issued Sep. 6, 2016, the disclosure of which is hereby incorporated herein in its entirety by this reference, etc.).

In some embodiments, the clean control valve 206, which includes an actuation stem 203 that moves one or more stoppers 308 along (e.g., linearly along) a body 205 of the valve 206, may selectively allow (e.g., input, place, etc.) high pressure clean fluid 210 provided from a high pressure inlet port 302 to enter a first chamber 202a on a clean side 220a of the piston 204a. The high pressure clean fluid 210 may act on the piston 204a moving the piston 204a in a direction toward the dirty side 221a of the piston 204a and compressing the dirty fluid in the first chamber 202a to produce the high pressure dirty fluid 216. The high pressure dirty fluid 216 may exit the first chamber 202a through the dirty discharge control valve 208a (e.g., outlet valve, high pressure outlet). At substantially the same time, the low pressure dirty fluid 212 may be entering the second chamber 202b through the dirty fill control valve 207b (e.g., inlet valve, low pressure inlet). The low pressure dirty fluid 212 may act on the dirty side 221b of the piston 204b moving the piston 204b in a direction toward the clean side 220b of the piston 204b in the second chamber 202b. The low pressure clean fluid 214 may be discharged (e.g., emptied, expelled, etc.) through the clean control valve 206 as the piston 204b moves in a direction toward the clean side 220b of the piston 204b reducing the space on the clean side 220b of the piston 204b within the second chamber 202b. A cycle of the pressure exchanger is completed once each piston 204a, 204b moves the substantial length (e.g., the majority of the length) of the respective chamber 202a, 202b (which "cycle" may be a half cycle with the piston 204a, 204b moving in one direction along the length of the chamber 202a, 202b and a full cycle includes the piston 204a, 204b moving in the one direction along the length of the chamber 202a, 202b and then moving in the other direction to return to substantially the original position). In some embodiments, only a portion of the length may be utilized (e.g., in reduced capacity situations). Upon the completion of a cycle, the actuation stem 203 of the clean control valve 206 may change positions enabling the high pressure clean fluid 210 to enter the second chamber 202b, thereby changing the second chamber 202b to a high pressure chamber and changing the first chamber 202a to a low pressure chamber and repeating the process.

In some embodiments, each chamber 202a, 202b may have a higher pressure on one side of the pistons 204a, 204b to move the piston in a direction away from the higher pressure. For example, the high pressure chamber may experience pressures between about 8,000 PSI (55,158 kPa) and about 13,000 PSI (89,632 kPa) with the highest pressures being in the high pressure clean fluid 210 to move the piston 204a, 204b away from the high pressure clean fluid 210 compressing and discharging the dirty fluid to produce the high pressure dirty fluid 216. The low pressure chamber 202a, 202b may experience much lower pressures, relatively, with the relatively higher pressures in the currently low pressure chamber 202a, 202b still being adequate enough in the low pressure dirty fluid 212 to move the piston 204a, 204b in a direction away from the low pressure dirty fluid 212 discharging the low pressure clean fluid 214. In some embodiments, the pressure of the low pressure dirty fluid 212 may be between about 100 PSI (689 kPa) and about 700 PSI (4,826 kPa), such as between about 200 PSI (1,379 kPa) and about 500 PSI (3,447 kPa), or between about 300 PSI (2,068 kPa) and about 400 PSI (2758 kPa).

Referring back to FIG. 1, in some embodiments, the system 100 may include an optional device (e.g., a pump) to pressurize the low pressure dirty fluid 212 (e.g., to a pressure level that is suitable to move the piston 204a, 204b toward the clean side) as it is being provided into the chambers 202a, 202b.

Referring again to FIG. 2, if any fluid pushes past the piston 204a, 204b (e.g., leak by, blow by, etc.) it will generally tend to flow from the higher pressure fluid to the lower pressure fluid. The high pressure clean fluid 210 may be maintained at the highest pressure in the system such that the high pressure clean fluid 210 may not generally become substantially contaminated. The low pressure clean fluid 214 may be maintained at the lowest pressure in the system. Therefore, it is possible that the low pressure clean fluid 214 may become contaminated by the low pressure dirty fluid 212. In some embodiments, the low pressure clean fluid 214 may be used to produce the low pressure dirty fluid 212 substantially nullifying any detriment resulting from the contamination. Likewise, any contamination of the high pressure dirty fluid 216 by the high pressure clean fluid 210 would have minimal effect on the high pressure dirty fluid 216.

In some embodiments, the dirty control valves 207a, 207b, 208a, 208b may be check valves (e.g., clack valves, non-return valves, reflux valves, retention valves, or one-way valves). For example, one or more of the dirty control valves 207a, 207b, 208a, 208b may be a ball check valve, diaphragm check valve, swing check valve, tilting disc check valve, clapper valve, stop-check valve, lift-check valve, in-line check valve, duckbill valve, etc. In additional embodiments, one or more of the dirty control valves 207a, 207b, 208a, 208b may be actuated valves (e.g., solenoid valves, pneumatic valves, hydraulic valves, electronic valves, etc.) configured to receive a signal from a controller and open or close responsive the signal.

The dirty control valves 207a, 207b, 208a, 208b may be arranged in opposing configurations such that when the chamber 202a, 202b is in the high pressure configuration the high pressure dirty fluid opens the dirty discharge control valve 208a, 208b while the pressure in the chamber 202a, 202b holds the dirty fill control valve 207a, 207b closed. For example, the dirty discharge control valve 208a, 208b comprises a check valve that opens in a first direction out of the chamber 202a, 202b, while the dirty fill control valve 207a, 207b comprises a check valve that opens in a second, opposing direction into the chamber 202a, 202b.

The dirty discharge control valves 208a, 208b may be connected to a downstream element (e.g., a fluid conduit, a separate or common manifold) such that the high pressure in the downstream element holds the dirty discharge valve 208a, 208b closed in the chamber 202a, 202b that is in the low pressure configuration. Such a configuration enables the low pressure dirty fluid to open the dirty fill control valve 207a, 207b and enter the chamber 202a, 202b.

Figure 3A:
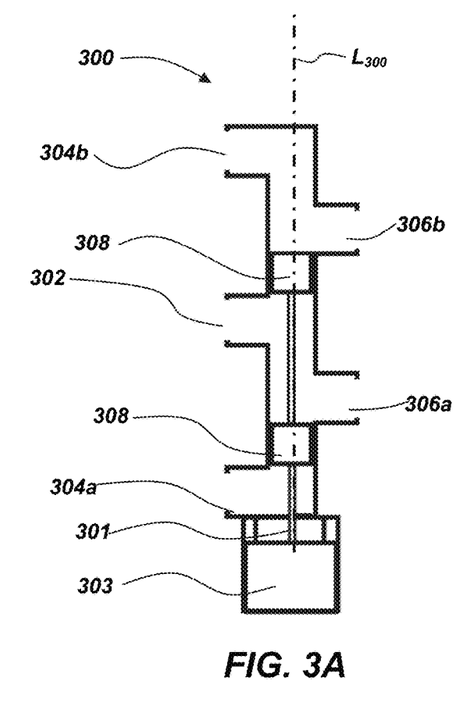
FIG. 3A is a cross-sectional view of a control valve in a first position according to an embodiment of the present disclosure.
Figure 3B:
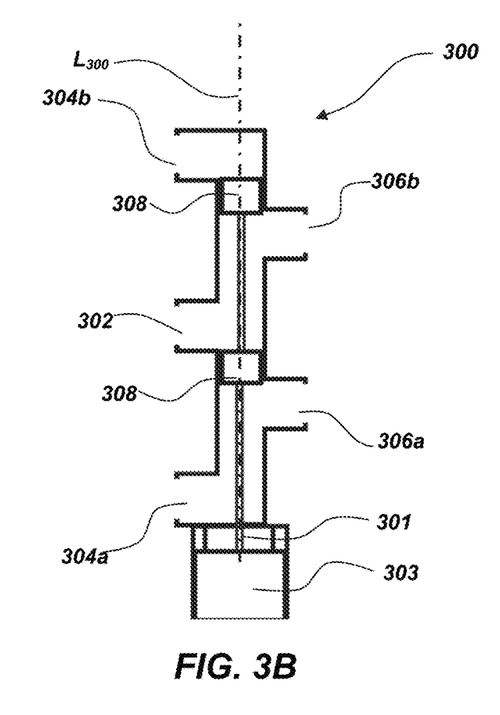
FIG. 3B is a cross-sectional view of a control valve in a second position according to an embodiment of the present disclosure.

FIGS. 3A and 3B illustrate a cross sectional view of an embodiment of a clean control valve 300 at two different positions. In some embodiments, the clean control valve 300 may be similar to the control valve 206 discussed above. The clean control valve 300 may be a multiport valve (e.g., 4 way valve, 5 way valve, LinX® valve, etc.). The clean control valve 300 may have one or more high pressure inlet ports (e.g., one port 302), one or more low pressure outlet ports (e.g., two ports 304a, 304b) and one or more chamber connection ports (e.g., two ports 306a, 306b). The clean control valve 300 may include at least two stoppers 308 (e.g., plugs, pistons, discs, valve members, etc.). In some embodiments, the clean control valve 300 may be a linearly actuated valve. For example, the stoppers 308 may be linearly actuated such that the stoppers 308 move along a substantially straight line (e.g., along a longitudinal axis $L_{300}$ of the clean control valve 300).

The clean control valve 300 may include an actuator 303 configured to actuate the clean control valve 300 (e.g., an actuator coupled to a valve stem 301 of the clean control valve 300). In some embodiments, the actuator 303 may be electronic (e.g., solenoid, rack and pinion, ball screw, segmented spindle, moving coil, etc.), pneumatic (e.g., tie rod cylinders, diaphragm actuators, etc.), or hydraulic. In some embodiments, the actuator 303 may enable the clean control valve 300 to move the valve stem 301 and stoppers 308 at variable rates (e.g., changing speeds, adjustable speeds, etc.).

FIG. 3A illustrates the clean control valve 300 in a first position. In the first position, the stoppers 308 may be positioned such that the high pressure clean fluid may enter the clean control valve 300 through the high pressure inlet port 302 and exit into a first chamber through the chamber connection port 306a. In the first position, the low pressure clean fluid may travel through the clean control valve 300 between the chamber connection port 306b and the low pressure outlet port 304b (e.g., may exit through the low pressure outlet port 304b).

FIG. 3B illustrates the clean control valve 300 in a second position. In the second position, the stoppers 308 may be positioned such that the high pressure clean fluid may enter the clean control valve 300 through the high pressure inlet port 302 and exit into a second chamber through the chamber connection port 306b. The low pressure clean fluid may travel through the clean control valve 300 between the chamber connection port 306a and the low pressure outlet port 304a (e.g., may exit through the low pressure outlet port 304a).

Now referring to FIGS. 2, 3A, and 3B, the clean control valve 206 is illustrated in the first position with the high pressure inlet port 302 connected to the chamber connection port 306a providing high pressure clean fluid to the first chamber 202a. Upon completion of the cycle, the clean control valve 206 may move the stoppers 308 to the second position thereby connecting the high pressure inlet port 302 to the second chamber 202b through the chamber connection port 306b.

In some embodiments, the clean control valve 206 may pass through a substantially fully closed position in the middle portion of a stroke between the first position and the second position. For example, in the first position, the stoppers 308 may maintain a fluid pathway between the high pressure inlet port 302 and the chamber connection port 306a and a fluid pathway between the chamber connection port 306b and the low pressure outlet port 304b. In the second position, the stoppers 308 may maintain a fluid pathway between the high pressure inlet port 302 and the chamber connection port 306b and a fluid pathway between the chamber connection port 306a and the low pressure outlet port 304a. Transitioning between the first and second positions may involve at least substantially closing both fluid pathways to change the connection of the chamber connection port 306a from the high pressure inlet port 302 to the low pressure outlet port 304a and to change the connection of the chamber connection port 306b from the low pressure outlet port 306b to the high pressure inlet port 302. The fluid pathways may at least substantially close at a middle portion of the stroke to enable the change of connections. Opening and closing valves, where fluids are operating at high pressures may result in pressure pulsations (e.g., water hammer) that can result in damage to components in the system when high pressure is suddenly introduced or removed from the system. As a result, pressure pulsations may occur in the middle portion of the stroke when the fluid pathways are closing and opening respectively.

In some embodiments, the actuator 303 may be configured to move the stoppers 308 at variable speeds along the stroke of the clean control valve 206. As the stoppers 308 move from the first position to the second position, the stoppers 308 may move at a high rate of speed while traversing a first portion of the stroke that does not involve newly introducing flow from the high pressure inlet port 302 into the chamber connection ports 306a, 306b. The stoppers 308 may decelerate to a low rate of speed as the stoppers 308 approach a closed position (e.g., when the stoppers 308 block the chamber connection ports 306a, 306b during the transition between the high pressure inlet port 302 connection and the low pressure outlet port 304a, 304b connection) at a middle portion of the stroke. The stoppers 308 may continue at a lower rate of speed, as the high pressure inlet port 302 is placed into communication with one of the chamber connection ports 306a, 306b. After traversing the chamber connection ports 306a, 306b, the stoppers 308 may accelerate to another high rate of speed as the stoppers 308 approach the second position. The low rate of speed in the middle portion of the stroke may reduce the speed that the clean control valve 206 opens and closes enabling the clean control valve to gradually introduce and/or remove the high pressure from the chambers 202a, 202b.

In some embodiments, the motion of the pistons 204a, 204b may be controlled by regulating the rate of fluid flow (e.g., of the incoming fluid) and/or a pressure differential between the clean side 220a, 220b of the pistons 204a, 204b, and the dirty side 221a, 221b of the pistons 204a, 204b at least partially with the movement of the clean control valve 206. In some embodiments, it may be desirable for the piston 204a, 204b in the low pressure chamber 202a, 202b to move at substantially the same speed as the piston 204a, 204b in the high pressure chamber 202a, 202b either by manipulating their pressure differentials in each chamber and/or by controlling the flow rates of the fluid in and out of the chambers 202a, 202b. However, the piston 204a, 204b in the low pressure chamber 202a, 202b may tend to move at greater speed than the piston 204a, 204b in the high pressure chamber 202a, 202b.

In some embodiments, the rate of fluid flow and/or the pressure differential may be varied to control acceleration and deceleration of the pistons 204a, 204b (e.g., by manipulating and/or varying the stroke of the clean control valve 206 and/or by manipulating the pressure in the fluid streams with one or more pumps). For example, increasing the flow rate and/or the pressure of the high pressure clean fluid 210 when the piston 204a, 204b is near a clean end 224 of the chamber 202a, 202b at the beginning of the high pressure stroke may increase the rate of fluid flow and/or the pressure differential in the chamber 202a, 202b. Increasing the rate of fluid flow and/or the pressure differential may cause the piston 204a, 204b to accelerate to or move at a faster rate. In another example, the flow rate and/or the pressure of the high pressure clean fluid 210 may be decreased when the piston 204a, 204b approaches a dirty end 226 of the chamber 202a, 202b at the end of the high pressure stroke. Decreasing the rate of fluid flow and/or the pressure differential may cause the piston 204a, 204b to decelerate and/or stop before reaching the dirty end of the respective chamber 202a, 202b.

Similar control with the stroke of the clean control valve 206 may be utilized to prevent the piston 204a, 204b from traveling to the furthest extent of the clean end of the chambers 202a, 202b. For example, the clean control valve 206 may close off one of the chamber connection ports 306a, 306b before the piston 204a, 204b contacts the furthest extent of the clean end of the chambers 202a, 202b by preventing any further fluid flow and slowing and/or stopping the piston 204a, 204b. In some embodiments, the clean control valve 206 may open one the chamber connection ports 306a, 306b into communication with the high pressure inlet port 302 before the piston 204a, 204b contacts the furthest extent of the clean end of the chambers 202a, 202b in order to slow, stop, and/or reverse the motion of the piston 204a, 204b.

If the pistons 204a, 204b reach the clean end 224 or dirty end 226 of the respective chambers 202a, 202b the higher pressure fluid may bypass the piston 204a, 204b and mix with the lower pressure fluid. In some embodiments, mixing the fluids may be desirable. For example, if the pistons 204a, 204b reach the dirty end 226 of the respective chambers 202a, 202b during the high pressure stroke, the high pressure clean fluid 210 may bypass the piston 204a, 204b (e.g., by traveling around the piston 204a, 204b or through a valve in the piston 204a, 204b) flushing any residual contaminants from the surfaces of the piston 204a, 204b. In some embodiments, mixing the fluids may be undesirable. For example, if the pistons 204a, 204b reach the clean end 224 of the respective chambers 202a, 202b during the low pressure stroke, the low pressure dirty fluid 212 may bypass the piston 204a, 204b and mix with the low pressure clean fluid contaminating the clean area in the clean control valve 206 with the dirty fluid.

In some embodiments, the system 100 may prevent the pistons 204a, 204b from reaching the clean end 224 of the respective chambers 202a, 202b. For example, the clean control valve 206 may include a control device 209 (e.g., sensor, safety, switch, etc.) to trigger the change in position of the clean control valve 206 on detecting the approach of the piston 204a, 204b to the clean end 224 of the respective chamber 202a, 202b such that the system 100 may utilize the clean control valve 206 to change flow path positions before the piston 204a, 204b reaches the clean end 224 of the chamber 202a, 202b.

In some embodiments, the system 100 may be configured to enable the pistons 204a, 204b to reach the dirty end 226 of the respective chambers 202a, 202b during the high pressure stroke. In some embodiments, the clean control valve 206 may include a control device 209 to trigger the change in position of the clean control valve 206 on detecting the approach of the piston 204a, 204b to the dirty end 226 of the respective chamber 202a, 202b. In some embodiments, the control device may be configured such that the control valve 206 does not complete the change in direction of the piston 204a, 204b until the piston 204a, 204b has reached the furthest extent of the dirty end 226 of the respective chamber 202a, 202b. In some embodiments, the control device may include a time delay through programming or mechanical delay that enables the piston 204a, 204b to reach the furthest extent of the dirty end 226 of the chamber 202a, 202b In some embodiments, the system 100 may be configured to enable the pistons 204a, 204b to reach the dirty end 226 of the respective chambers 202a, 202b during the high pressure stroke and prevent the pistons 204a, 204b from reaching the clean end 224 of the respective chambers 202a, 202b during the low pressure stroke. For example, the system 100 may drive both of the pistons 204a, 204b a select distance through the respective chambers 202a, 202b where the pistons 204a, 204b is maintained a select distance from the clean end 224 while enabling the pistons 204a, 204b to travel relatively closer to or come in contact with, the dirty end 226. In some embodiments, the system 100 may be configured such that the pressure differential across the piston 204a, 204b in the low pressure chamber 202a, 202b may be less than the pressure differential across the piston 204a, 204b in the high pressure chamber 202a, 202b such that the piston 204a, 204b travels slower during the low pressure cycle than the high pressure cycle.

In some embodiments, the control device 209 may be configured to trigger the change in position of the clean control valve 206 on detecting the approach of the piston 204a, 204b to the clean end 224 of the respective chamber 202a, 202b such that the clean control valve 206 may change positions before the piston 204a, 204b reaches the clean end 224 of the chamber 202a, 202b. In some embodiments, the control device 209 may be configured to trigger the change in position of the clean control valve 206 on detecting the approach of the piston 204a, 204b to the dirty end 226 of the respective chamber 202a, 202b. In some embodiments, the control device may be configured to trigger the change in position of the clean control valve 206 by evaluating both of the pistons 204a, 204b as they respectively approach the clean end 224 and the dirty end 226 of the chambers 202a, 202b. For example, the control device 209 may detect the approach of the piston 204a, 204b to the dirty end 226 of the chamber 202a, 202b and begin a timer (e.g., mechanical timer, electronic timer, programmed time delay, etc.) If the control device 209 detects the approach of the piston 204a, 204b to the clean end 224 of the chamber 202a, 202b before the time triggers the change in position of the clean control valve 206, the control device 209 may override the timer and change the position of the clean control valve 206 to prevent the piston 204a, 204b from reaching the clean end 224 of the chamber 202a, 202b.

In some embodiments, an automated controller may produce signals that may be transmitted to the clean control valve 206 directing the clean control valve 206 to move from the first position to the second position or from the second position to the first position (e.g., at a constant and/or variable rate).

Figure 4:
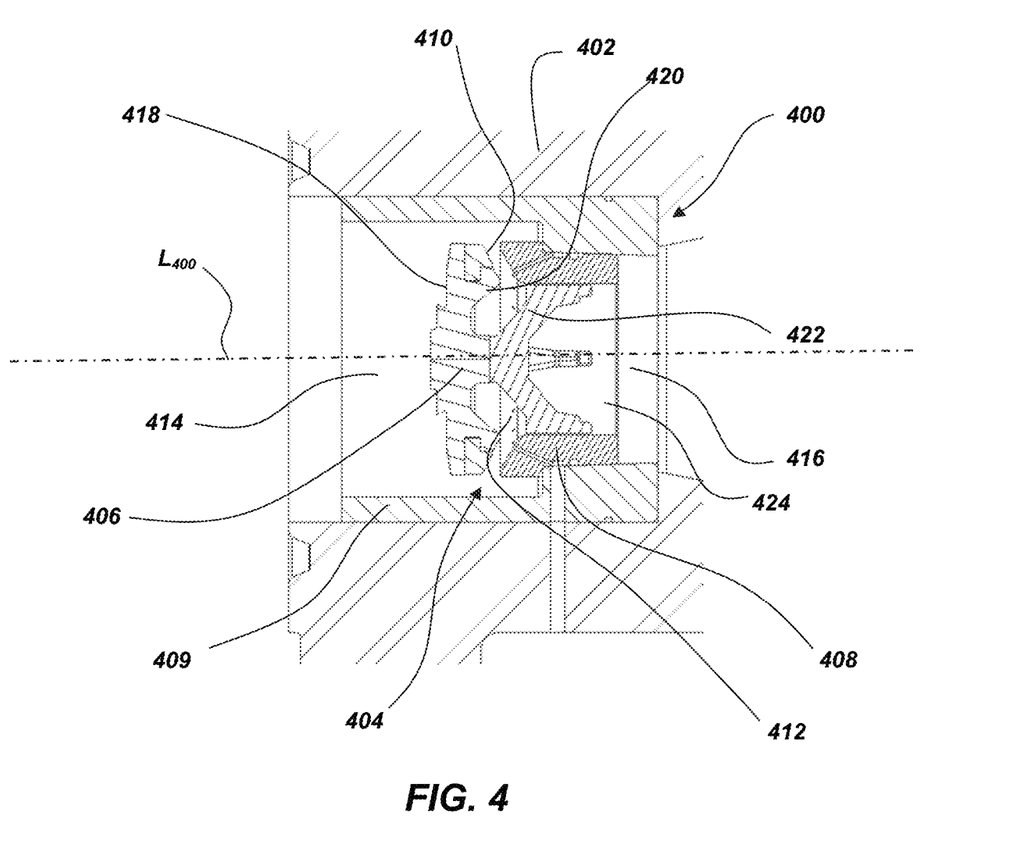
FIG. 4 is a cross-sectional view of a valve in a portion of a fluid handling device according to an embodiment of the present disclosure.

FIG. 4 illustrates a cross-sectional view of a valve 400 (e.g., a check valve, globe valve, stopper valve, etc.) positioned in a portion of a fluid handling device 402 (e.g., in a port defining an inlet and/or outlet of the device, such as, for example, the pressure exchange devices discussed above) in an open position. In some embodiments, the valve 400 may be similar to and perform the same function as the control valves 207a, 207b, 208a, 208b (FIG. 2).

In some embodiments, the valve 400 may include a valve seat 404 (e.g., a seating region or area where two or more surfaces form a seal) on a valve body 408, and a valve member 406 (e.g., disk, disc, obstructer, ball, poppet, etc.) disposed within a valve sleeve 409 (e.g., bore, case, liner, etc.). As depicted, the valve 400 may comprises a one-way check valve. The valve member 406 may be configured to move along an axis $L_{400}$ of the valve 400. The valve member 406 may include a seating surface 410 configured to contact a complementary seating surface 412 on the valve body 408. One or more of the seating surface 410 and the complementary seating surface 412 may include a sealing member (e.g., a metal, rubber, and/or polymer seat). For example, the seating surface 410 on the valve member 406 may be defined by an annular metal, rubber, and/or polymer seat. As depicted, the seating surface 410 may be defined by an outer annular ring (e.g., a polymer O-ring seat) and an inner portion of the valve member 406 (e.g., a metal inner portion).

One or more of the valve body 408 and the sleeve 409 may define a fluid passageway 424 for fluid to travel through the valve 400 (e.g., substantially along an axis $L_{400}$ of the valve 400).

The valve member 406 may be configured to move axially (e.g., along the axis $L_{400}$ of the valve 400) relative to the valve body 408. In some embodiments, the valve member 406 may include one or more guide elements 422 (e.g., legs, stem, cage, stops, tracks, etc.) configured to control the motion of the valve member 406. For example, the guide elements 422 may be configured to maintain the valve member 406 in a substantially coaxial orientation relative to the valve body 408. In some embodiments, the guide elements 422 may be configured to limit the movement of the valve member 406, such as limiting a stroke (e.g., travel, axial displacement, etc.) of the valve member 406.

In some embodiments, the movement of the valve member 406 may be controlled by a differential pressure between fluids on a first side 414 and a second side 416 of the valve member 406. For example, a higher pressure fluid on the first side 414 may generate a force on a first surface 418 of the valve member 406 moving the valve member 406 in a direction toward the second side 416. When the seating surface 410 of the valve member 406 contacts (e.g., rests on, seals against, etc.) the complementary seating surface 412 of the valve body 408, the valve member 406 may at least partially (e.g., nearly substantially, substantially, or completely) inhibit flow of the fluid from the first side 414 of the valve member 406 to the second side 416 of the valve member 406. A higher pressure fluid on the second side 416 of the valve member 406 may generate a force on a second surface 420 of the valve member 406 moving the valve member 406 in a direction toward the first side 414. When the seating surface 410 of the valve member 406 moves away from the complementary seating surface 412 of the valve body 408, the valve member 406 may enable the fluid to flow from the second side 416 of the valve member 406 to the first side 414 of the valve member 406.

In some embodiments, the valve member 406 may be biased in at least one direction. For example, the valve 400 may include a biasing element (e.g., spring, washers, etc.) for example, positioned on the guide elements 422 and configured to bias the valve member 406 in a closed position (e.g., in a direction toward the second side 416). In another example, the biasing element may be configured to bias the valve member 406 in an open position (e.g., in a direction toward the first side 414).

In some embodiments, the fluid passing through the valve 400 may include contaminants (e.g., particles, particulates, sediment, proppant, chemicals, abrasives, foreign material, etc.). Contaminants may generate buildups or obstructions on components of the valves. For example, the contaminants may create buildups on one or more portions of the valve seat 404, for example, the seating surface 410 and/or the complementary seating surface 412. Buildups on the seating surface 410 and/or the complementary seating surface 412 may cause the valve 400 to stop functioning correctly. For example, the valve member 406 may stick in an open or a closed position, or the buildup may prevent the seating surface 410 from contacting the complementary seating surface 412 such that the valve member 406 may not substantially inhibit fluid flow from the first side 414 to the second side 416.

Figure 5:
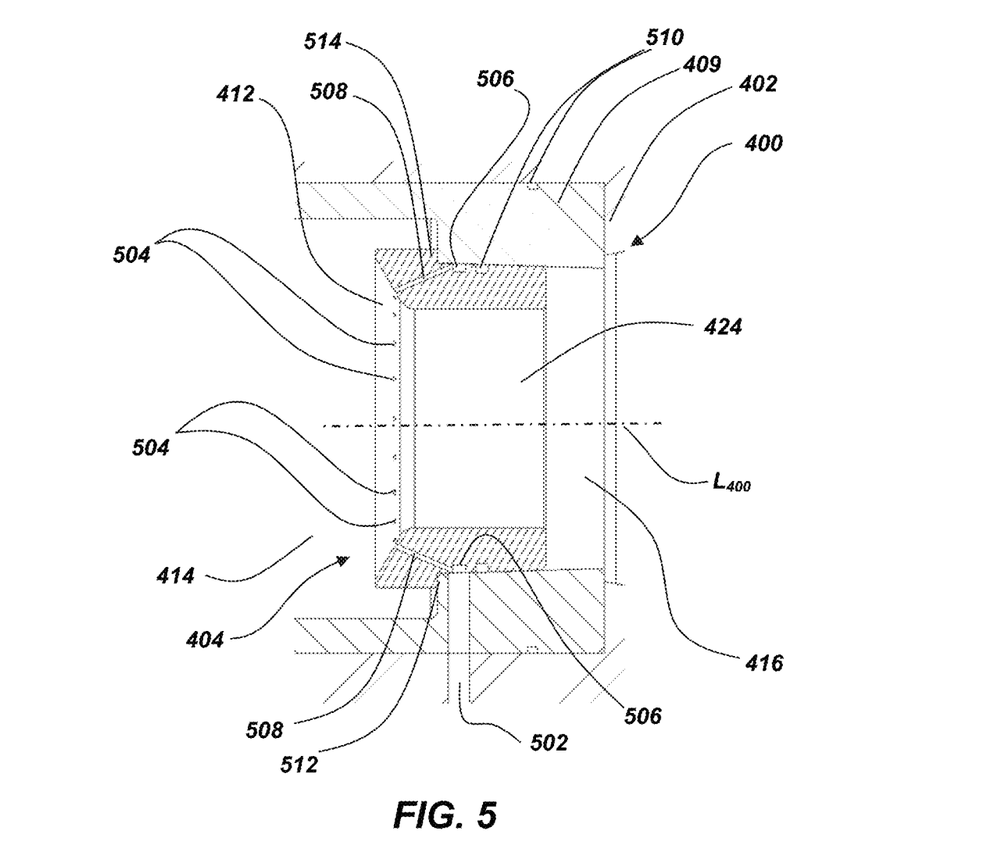
FIG. 5 is an enlarged cross-sectional view of a valve in a portion of a fluid handling device according to an embodiment of the present disclosure.

FIG. 5 illustrates a close-up cross-sectional view of the valve 400 with the valve member 406 (FIG. 4) removed. Referring to FIGS. 4 and 5, the valve 400 may include a self-cleaning feature (e.g., a flushing feature) for cleaning (e.g., removing debris and/or other foreign material) one or more portions of the valve seat 404, for example, the seating surface 410 and/or the complementary seating surface 412. The flushing or self-cleaning feature may include fluid outlets 504 coupled to a fluid source. The fluid source may be separate from the fluid that is passing through the valve 400. For example, a fluid or otherwise flowable material may be supplied to the fluid outlets 504 from a source of fluid that is distinct and separate from the fluid flowing through fluid passageway 424 (e.g., from a clean fluid source that is separate from the dirty source feeding the dirty ends of the chambers 202a, 202b (FIG. 2).

The valve 400 may include one or more inlet ports 502 (e.g., a single inlet port 502) configured to receive a fluid or otherwise flowable material (e.g., a cleaning agent, clean fluid, detergent, cleaning fluid, etc.) from a fluid source or reservoir. In some embodiments, the fluid may be introduced into the inlet port 502 at a high pressure (e.g., at least higher pressure than the fluid in the second side 416 of the valve member 406).

As depicted, the complementary seating surface 412 may include the nozzles 504 (e.g., ports, sprayers, apertures, discrete apertures, etc.) configured to introduce (e.g., spray, deliver, disperse) the fluid into the area of the valve seat 404 between the complementary seating surface 412 and the seating surface 410. The nozzles 504 may be positioned in the valve body 408 and positioned to introduce the fluid into the area between the complementary seating surface 412 and the seating surface 410. In additional embodiments, the nozzles 504 may be positioned in another portion of the valve 400 (e.g., the valve member 406, the valve sleeve 409).

In some embodiment, the nozzles 504 may be oriented to deliver fluid between the complementary seating surface 412 and the seating surface 410 in a direction complementary to the fluid flow in the valve 400 (e.g., upstream or downstream through the valve 400). For example, the nozzles 504 may direct fluid toward the valve member 406 where the openings of the nozzles lay substantially in line (e.g., in plane) with the complementary seating surface 412. In such an embodiment, fluid may be flowing from the second side 416 toward the first side 414. The nozzles 504 may provide fluid directed in the same direction of the fluid flow through the valve 400 to enhance flushing of particles from one or more portions of the valve seat 404.

In additional embodiments, the nozzles 504 may direct fluid is a direction away from the valve member 406 (e.g., directed toward the axis $L_{400}$ of the valve 400) where the openings of the nozzles 504 lay substantially transverse to with the complementary seating surface 412 (e.g., the openings of the nozzles 504 are cut into the complementary seating surface 412. In such an embodiment, fluid may be flowing from the first side 414 toward the second side 416. The nozzles 504 may provide fluid directed in the same direction of the fluid flow through the valve 400 to enhance flushing of particles from one or more portions of the valve seat 404.

The valve 400 may include one or more fluid passageways in order to deliver fluid to the nozzles 504. For example, one or more channels 506 (e.g., grooves, annular ring) may be defined in the valve body 408. The channel 506 may be configured to communicate the fluid from the inlet port 502 in a direction transverse (e.g., perpendicular) to the axis $L_{400}$ of the valve 400 to other locations around the valve seat 404. For example, the channel 506 may define a common fluid reservoir configured to communicate the fluid from the inlet ports 502 to the nozzles 504. In some embodiments, the channel 506 may be formed in an outer circumference of the valve body 408. For example, the channel 506 may be formed as an open annular channel or groove in the outermost portion of the valve body 408. In additional embodiments, the channels 506 may be defined in an inner circumference of the sleeve 409.

As depicted, the inlet port 502 may extend from a fluid source through a portion of the fluid handling device 402, through the sleeve 409 and to the channel 506 in the valve body 408.

The nozzles 504 may be connected (e.g., fluidly coupled, commonly coupled) to the one or more channels 506 by one or more fluid pathways 508 (e.g., vias, conduits, tubes, passage, etc.). For example, the fluid pathways 508 may comprise individual fluid pathways 508 that each connect one respective nozzle 504 to the common channel 506. The fluid pathways 508 may transfer the fluid in a direction at least partially along the axis $L_{400}$ of the valve 400 from the channels 506 to the nozzles 504. The nozzles 504 may be directly connected to the channel 506. In some embodiments, the nozzles 504 may be connected to the inlet ports 502 directly with individual fluid pathways 508.

In additional embodiments, the fluid pathway 508 may comprise a common fluid pathway 5008 (e.g., a substantially annular fluid pathway) that commonly connects each of the nozzles 504 to the common channel 506.

The nozzles 504 may be defined into the complementary seating surface 412 (e.g., machined, forged, cast, etc.). In some embodiments, the nozzles 504 may be formed separately and attached to the complementary seating surface 412 (e.g., welded, brazed, soldered, threaded, pressed, glued, epoxied, etc.). In some embodiments, the nozzles 504 may exhibit different orifice characteristics (e.g., sizes, shapes, spray patterns, etc.). The nozzles 504 may be selected for different positions (e.g., positions within the valve 400, positions on the complementary seating surface 412, etc.) based on the characteristics of the orifice in the nozzles 504.

As depicted, the nozzles 504 may be uniformly spaced (e.g., evenly spaced, equidistant) radially about (e.g., around) the axis $L_{400}$ of the valve 400. The nozzles 504 may be positioned at substantially the same radial displacement relative to the axis $L_{400}$ of the valve 400. In additional embodiments, the nozzles 504 may be positioned at alternating radial displacements relative to the axis $L_{400}$ and/or at unequal spacing radially about the axis $L_{400}$.

Referring still to FIGS. 4 and 5, the fluid may be provided to the inlet port 502 at a pressure greater than about 500 PSI (3,447.4 kPa), such as greater than about 1,000 PSI (6,894.8 kPa), greater than about 10,000 PSI (68,947.6 kPa), or greater than about 13,000 PSI (89,631.8 kPa). The fluid may travel around the valve body 408 in the channel 506 in order to be distributed to the nozzles 504 via the fluid pathway or pathways 508.

In some embodiments, the fluid may be provided to the inlet port 502 during operation of the system, such that the fluid may be introduced into the valve seat 404 area between the seating surface 410 and the complementary seating surface 412 at any time when the seating surface 410 is not contacting the complementary seating surface 412. In some embodiments, the fluid may only be introduced following a trigger or signal from the valve 400. For example, the fluid may be introduced responsive a signal from the sensor, for a period of time (e.g., preprogrammed time, mechanical timer, until another signal is received). In some embodiments, the fluid may be introduced on a sensor that is monitoring performance of the valve 400, for example, when the seating surface 410 is not coming into proper contact with the complementary seating surface 412. In some embodiments, the fluid may be introduced on timer (e.g., mechanical timer, programmed timer, etc.) configured to introduce the fluid.

As shown in FIG. 5, the valve sleeve 409 may include a shoulder 512 configured to receive a complementary should 514 of the valve body 408 in order to secure the valve body 408 and to position the channel 506 relative to the inlet port 502.

The valve body 408 and the valve sleeve 409 may include one or more seals 510 for minimizing any fluid from traveling between the valve body 408, the valve sleeve 409, and the fluid handling device 402.

In some embodiments, one or more of the valve body 408, the sleeve 409, and the valve member 406 may be interchangeable to enable for variation in flushing hole nozzle angle, flow through valve 400, and actuation of the valve 400, depending on the particular application. For example, the valve body 408 may be changed out to provide nozzles 504 in a differing orientation, size, flow rate, etc. As discussed above, the angle of the openings of the nozzles 504 may be varied in order to flush particles upstream or downstream in the path of least resistance and away from one or more portions of the valve seat 404. In some embodiments, the opening size of the nozzles 504 may be varied to ensure that flow and pressure will effectively remove particles from one or more portions of the valve seat 404, which will be dependent on application. In some embodiments, delivery of the flushing fluid may be varied between a continuous flush and a controlled flush so that the flushing fluid is either constantly flowing or is controlled to only flow when the valve 400 is open (e.g., when the seating surface 412 of the valve body 408 and the valve member 406 are separated).

Now referring back to FIGS. 1 and 2. In some embodiments, the pressure exchanger 104 may be formed from multiple linear pressure exchangers 200 operating in parallel. For example the pressure exchanger 104 may be formed from at least 3 linear pressure exchangers, such as at least 5 linear pressure exchangers, or at least 7 linear pressure exchangers. In some embodiments, the pressure exchanger 104 may be modular such that the number of linear pressure exchangers 200 may be changed by adding or removing sections of linear pressure exchangers based on flow requirements. In some embodiments, an operation may include multiple systems operating in an area and the pressure exchangers 104 for each respective system 100 may be adjusted as needed by adding or removing linear pressure exchangers from other systems in the same area.

Pressure exchangers may reduce the amount of wear experienced by high pressure pumps, turbines, and valves in systems with abrasive, caustic, or acidic fluids. The reduced wear may allow the systems to operate for longer periods with less down time resulting in increased revenue or productivity for the systems. Additionally, the repair costs may be reduced as fewer parts may wear out. In operations such as fracking operations, where abrasive fluids are used at high temperatures, repairs and downtime can result in millions of dollars of losses in a single operation. Embodiments of the present disclosure may result in a reduction in wear experienced by the components of systems where abrasive, caustic, or acidic fluids are used at high temperatures. The reduction in wear will result in cost reduction and increased revenue production.

Embodiments of the present disclosure may provide valves configured to remove contaminants from internal components of the valves. Contaminants (e.g., slurry particles) may damage internal components of the valves shortening the operational life of the valves and preventing the valves from operating properly. In slurry service, the system check valves are exposed to fluid particles and contaminates. During check valve operation, these fluid slurries contact and abrasively wear the check valve seat and disc surfaces, which affects the operation and shortens the lifetime of the valves. Wear on the seat and disc surfaces alter the design clearances and surface quality and cause the valve to become ineffective in its ability to seal high pressure fluid from low pressure fluid. To extend the lifetime of the check valve and minimize wear, the particles must be cleared from the contact zones of the valve seat to the maximum possible extent before closing the valve. Flushing one or more portions of the valve seat before the valve closes may minimize particles that become compressed between valves seating surfaces when the valve is closed. During normal operation, when the valve is closed, there is a large pressure differential across the disc, and the force causes wear on the seat and disc sealing surfaces. Minimizing the particles on the surface will reduce wear on the components of the valve, and maximize the lifetime of the valve. Valves according to embodiments of the present disclosure may have an extended operational life. Valves often are involved in operations that experience large losses of income for any downtime, such as fracking operations. Valves according to embodiments of the present disclosure may allow operations to operate for longer periods of time between repairs resulting in greater profits and reduced losses for downtime.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventors.

What is claimed is:

1. A valve comprising:
 a valve body having a fluid pathway defined through the valve body, the valve body being formed of a metal material and the metal material of the valve body defining a first seating surface;
 a valve member coupled to the valve body defining a second seating surface and, the valve member being movable relative to the valve body in order to at least partially obstruct the fluid pathway when the second seating surface of the valve member contacts the first seating surface of the valve body; and
 at least one flushing feature comprising another fluid pathway defined by the valve body that extends to at least a portion of the valve and terminates in openings defined in the first seating surface, the openings of the at least one flushing feature defined in the first seating surface configured to supply fluid to the at least a portion of the valve through the first seating surface along the another fluid pathway at least partially separated from the fluid pathway of the valve body, the at least one flushing feature configured to at least partially displace material from the valve.

2. The valve of claim 1, wherein the at least one flushing feature is configured to remove foreign material from the first seating surface of the valve body.

3. The valve of claim 2, wherein the at least one flushing feature comprises apertures extending around and through the first seating surface, the apertures being fluidly coupled to the fluid pathway.

4. The valve of claim 1, further comprising an annular ring defined by a portion of the valve, the annular ring extending around a primary direction of fluid flow along the fluid pathway and defining the another fluid pathway.

5. The valve of claim 4, wherein the at least one flushing feature comprises apertures extending around and through the first seating surface, the apertures being commonly fluidly connected to the annular ring, the at least one flushing feature configured to receive the fluid into the annular ring, disperse the fluid to the apertures with the annular ring, and provide the fluid to the first seating surface as the fluid exits the apertures.

6. The valve of claim 1, further comprising a sleeve, the valve body being disposed in the sleeve, a fluid channel being defined in the sleeve configured to deliver a fluid to the another fluid pathway through the fluid channel in the sleeve.

7. The valve of claim 1, wherein the valve comprises a check valve, the valve member being coupled to the valve body and biased relative to the valve body in one of an open position or a closed position.

8. The valve of claim 1, further comprising a sleeve, the valve body being disposed in the sleeve, a fluid channel comprising an annular ring being collectively defined by both the sleeve and the valve body at an interface between the sleeve and the valve body, the fluid channel configured to deliver a fluid to the openings from the another fluid pathway through the fluid channel in the sleeve.

9. The valve of claim 8, wherein the at least one flushing feature comprises apertures extending around and through a portion of a valve seat, the apertures being fluidly coupled to the another fluid pathway.

10. A device for exchanging pressure between fluids, the device comprising:
   at least one tank comprising:
      a first side for receiving a first fluid;
      a second side for receiving a second fluid;
      at least one port positioned proximate to the second side of the at least one tank and defining a first fluid pathway; and
      at least one valve disposed along the first fluid pathway of the at least one port, the at least one valve configured to at least one of enable the second fluid to enter the at least one tank or enable the second fluid to exit the at least one tank, the at least one valve comprising:
         a valve body defining a portion of the first fluid pathway, the valve body further defining a portion of a second fluid pathway;
         a metal valve seat;
         a valve member configured to define a seal with the valve seat; and
         a self-cleaning feature comprising fluid channels, the self-cleaning feature configured to supply fluid to at least a portion of the valve seat of the at least one valve along the second fluid pathway and through the metal valve seat, the at least one self-cleaning feature configured to at least partially displace material from at least one of the valve seat or the valve member.

11. The device of claim 10, wherein the self-cleaning feature comprises a plurality of discrete apertures defined in and extending around the valve seat, the discrete apertures being commonly and fluidly coupled to the second fluid pathway.

12. The device of claim 11, wherein the fluid pathway comprises an annular ring define in the valve body, the annular ring extending around a primary direction of fluid flow along the fluid pathway.

13. The device of claim 12, wherein the annular ring is defined in an outer circumference of the valve body.

14. The device of claim 13, wherein the valve body is disposed in a sleeve disposed in the at least one port, wherein a portion of the fluid pathway is defined by the sleeve.

15. The device of claim 10, wherein the at least one valve comprises a check valve biased in one of an open position or a closed position.

16. The device of claim 10, wherein the at least one valve comprises two valves, a first valve of the two valves configured to enable the second fluid comprising a downhole fluid at a lower pressure to enter the at least one tank, a second valve of the two valves configured to enable the downhole fluid at a second higher pressure to exit the at least one tank.

17. The device of claim 10, wherein the valve body is disposed in a sleeve disposed in the at least one port, wherein the second fluid pathway extends from the self-cleaning feature defined in the valve seat, through the valve body, through the valve sleeve, and to a fluid source.

18. A device for exchanging pressure between fluids, the device comprising:
   at least one tank comprising:
      a clean side for receiving a clean fluid at a higher pressure;
      a dirty side for receiving a downhole fluid at a lower pressure;
      at least one port positioned proximate to the dirty side of the at least one tank and defining a fluid pathway; and
      at least one valve disposed along the fluid pathway of the at least one port, the at least one valve configured to at least one of enabling the downhole fluid to enter the at least one tank or enabling the downhole fluid to exit the at least one tank, the at least one valve comprising:
         a valve body;
         a metal valve seat;
         a valve member configured to define a seal with the valve seat; and
         at least one flushing feature comprising one or more fluid channels, the at least one flushing feature configured to supply fluid to at least a portion of the valve seat of the at least one valve along another fluid pathway at least partially separated from the fluid pathway of the at least one port, the at least one flushing feature configured to at least partially displace material from the valve seat; and
      a directional valve device configured to selectively place the clean fluid at the higher pressure in communication with the downhole fluid at the lower pressure through at least one piston in order to pressurize the downhole fluid to a second higher pressure.

19. A method of operating a valve, the method comprising:
- flowing fluid through a valve body along a fluid pathway defined through the valve body;
- at least partially obstructing flow of the fluid through the valve body by moving a valve member toward a rigid valve seat defined by the valve body; and
- at least partially displacing material from the valve by supplying fluid to at least a portion of the valve through the rigid valve seat along another fluid pathway at least partially separated from the fluid pathway of the valve body with at least one flushing feature comprising the another fluid pathway extending to an opening through the valve seat.

20. The method of claim 19, wherein at least partially displacing material from the valve comprises displacing particulates from the fluid from the valve seat with the at least one flushing feature.

* * * * *